United States Patent
Giovannardi

(10) Patent No.: US 6,489,603 B1
(45) Date of Patent: Dec. 3, 2002

(54) METHOD FOR CALIBRATING A PHOTOELECTRIC CELL

(75) Inventor: Fabio Giovannardi, Bologna (IT)

(73) Assignee: Datasensor S.p.A., Bologna (IT)

( * ) Notice: Subject to any disclaimer, the term of this patent is extended or adjusted under 35 U.S.C. 154(b) by 223 days.

(21) Appl. No.: 09/657,523

(22) Filed: Sep. 8, 2000

(30) Foreign Application Priority Data

Apr. 20, 2000 (EP) .......................................... 00830299

(51) Int. Cl.$^7$ ........................... G01V 9/04; H01L 31/062
(52) U.S. Cl. .......................... 250/214 A; 250/214.6; 250/221; 327/514
(58) Field of Search .................. 250/214 A, 214 AG, 250/214 C, 221, 222.1; 327/514; 340/555–557

(56) References Cited

U.S. PATENT DOCUMENTS

| 5,336,882 A | | 8/1994 | Fooks et al. |
| 5,742,200 A | * | 4/1998 | He ............................. 329/320 |
| 6,069,377 A | * | 5/2000 | Prentice et al. ......... 250/214 A |

FOREIGN PATENT DOCUMENTS

| DE | 38 04 073 | 8/1989 |
| DE | 197 54 963 | 7/1999 |
| EP | 0 921 491 | 6/1999 |
| EP | 0 947 942 | 10/1999 |

OTHER PUBLICATIONS

Osaki Yoshiharu, *Patent Abstracts of Japan*, vol. 012, No. 284, Pub. No. 63061922, Mar. 1988, "Luminance Measuring Instrument".

Yamada Naoya, *Patent Abstracts of Japan*, vol. 1996, No. 06, Pub. No. 08043447, Feb. 1996, "Method for Calibrating Optical Fiber Type CT".

* cited by examiner

Primary Examiner—Stephone B. Allen
(74) Attorney, Agent, or Firm—Nixon & Vanderhye P.C.

(57) ABSTRACT

A method for calibrating photoelectric cells is described, which is based on a single acquisition step, of an object or of the background of the detection field of the photoelectric cell, respectively. The method allows carrying out a faster calibration with respect to the traditional dual-acquisition calibration method. In an embodiment, the two acquisition methods can be alternatively used at the discretion of the user.

24 Claims, 3 Drawing Sheets

METHOD FOR CALIBRATING A PHOTOELECTRIC CELL

Figure 1:
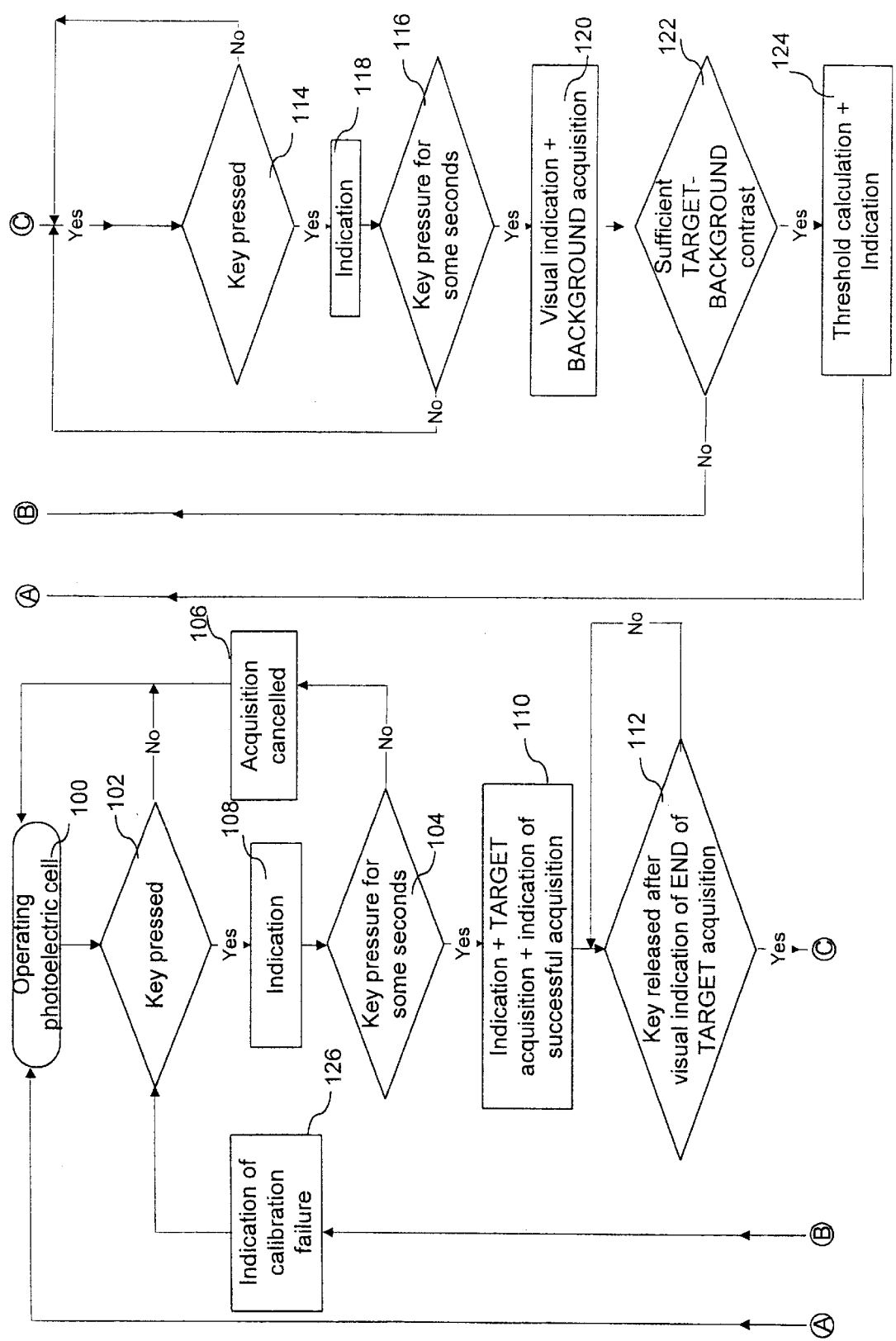

The present invention relates to a method for calibrating a photoelectric cell.

Photoelectric cells are commonly used in a wide range of fields, and with different functions, all of which nevertheless can be said to relate to a switching between two states of a user, caused by the change of the luminous signal received by a photo-receiver of the photoelectric cell when an object (or a person) passes in the field of optical detection of the photoelectric cell, superimposing itself to the detection background and intercepting the light beam emitted by a photo-emitter of the photoelectric cell.

In fact, generally a photoelectric cell comprises a photo-emitter, which generates a luminous signal, a photo-receiver or photodetector, which receives—directly or after reflection—the luminous signal emitted by the photoemitter and converts it into an electrical signal, and a comparator, which compares the signal received to a triggering threshold and provides a binary output signal that represents the presence or the absence of an object, and which is used for driving a user.

For sake of brevity, the terms "Target" and "Background" in the following description shall be indifferently used to indicate respectively both the object and the signal detected in the presence of the object, and both the detection background and the signal detected in the absence of the object.

In the following description, and according to the current terminology, the photoelectric cell is said to operate "in the light" if the output is active when the sensor is in the operating condition in which it receives the maximum light, that is to say, above the triggering threshold. Vice versa, the photoelectric cell is said to operate "in the dark" if the output is active when the sensor is in the operating condition in which it receives the minimum light, that is to say, below the triggering threshold.

Since photoelectric cells are commonly provided with a normal output or Q, and a complementary output or Qneg, the operation "in the light" or "in the dark" can be selected using the output that meets the requirements of the particular user. Among the typical applications, in proximity applications, based on the reflection of the light by the object intercepting the light beam emitted by the photo-emitter, the most typical operation is that in the light, corresponding to the activation of the photoelectric cell in the presence of the object. On the other hand, in "barrier" applications, that is, based on the object interrupting the light beam emitted by the photo-emitter, the most typical logic of operation is that in the dark, again corresponding to the activation of the photoelectric cell in the presence of the object. Usually, barrier applications are further distinguished between "through-beam barrier applications", wherein the photodetector and the photo-emitter are housed in separate devices which are mounted so as to face each other, and "retroreflex barrier applications", wherein the light emitted by the photo-emitter is reflected by a prismatic reflector, which sends it to the photo-receiver, housed in the same device as the photo-emitter.

In any case, the photoelectric cells must be calibrated upon installation, that is to say, the triggering threshold must be set according to the type of object to be detected and according to the distance of the object itself.

A first calibration method is the so-called variable-resistance or trimmer acquisition method: during calibration, for example in the "proximity" case, the object is arranged into the detection field, and the trimmer is brought to the minimum position, after which it is rotated, thus increasing the sensitivity of the photo-receiver, until the in-the-light output turns on. At that point, the rotation is continued for a little more so as to have a triggering threshold corresponding to a greater distance of the target.

However, in photoelectric cells with key calibration, the calibration occurs through two different acquisition steps: Target acquisition and Background acquisition.

FIG. 1 illustrates a flow chart of the known dual-acquisition calibration method, which provides for a sequence of at least two pressures of the calibration key (alternatively, there can be two different keys, one for the Target and another for the Background, the logic of operation being totally equivalent). Thus, starting from an operating state 100 of the photoelectric cell, in a first block 102 a first pressure of the acquisition key is waited for, which must last for some seconds, as checked in a block 104; otherwise, the operating state 100 is returned to, cancelling the acquisition in block 106. Usually, furthermore, as indicated with reference numeral 108, there is a visual indication of the pressure of the acquisition key. If the first key pressure lasts enough, the Target acquisition block 110 is entered, accompanied by the visual indication of acquisition in progress and successful acquisition. As indicated with reference numeral 112, at this point it is waited for the key to be released for at least one moment, and afterwards, a second pressure of the key is waited for (block 114), also lasting for a certain period of time (block 116) and accompanied by a visual indication (block 118). Should that be the case, the Background acquisition is carried out in block 120, accompanied by the visual indication. Then, in a block 122, it is checked whether the contrast between Target and Background is sufficient, as it shall be better described hereinafter, visually indicating the occurrence or the failure of the calibration in blocks 124 and 126, respectively. In positive case, the photoelectric cell returns to the operating state 100, whereas in negative case, block 102 is returned to, waiting for the first key pressure.

Figure 2:
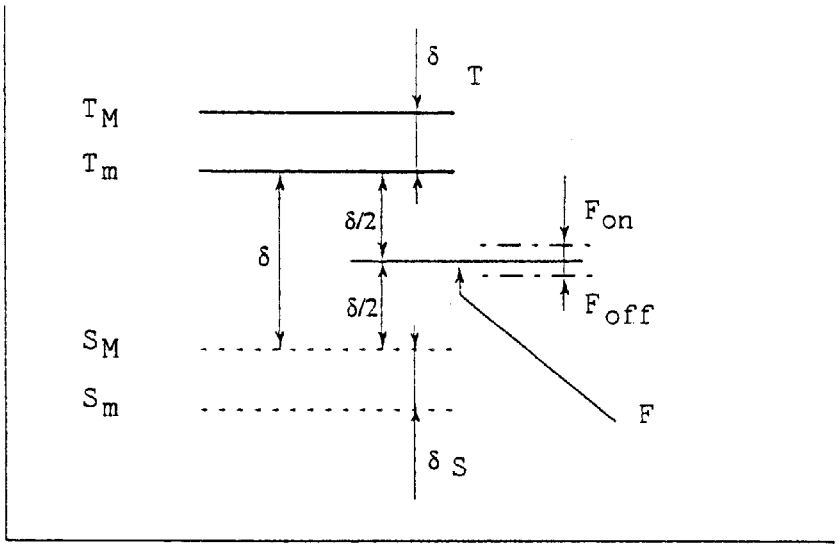

With reference to FIG. 2, which graphically illustrates the signal levels concerning the traditional calibration of a photoelectric cell, it must be specified that when both the Target and the Background are acquired, actually a certain number of readings is carried out so as to obtain a first series of data associated to the Target, and a second series of data associated to the Background. The maximum $T_M$ and the minimum $T_m$ reading signal for the Target and the maximum $S_M$ and the minimum $S_m$ reading signal for the Background are extracted from this series of data. Then, the traditional calibration algorithm provides for calculating the interval amplitudes between the maximum and minimum value detected, $\delta_T = T_M - T_m$ and $\delta_S = S_M - S_m$, multiplying the greatest one (to which a suitable constant can be added in advance) by a safety constant, and finally, checking whether the distance $\delta$ between the intervals is greater than the product thus obtained. This is the acquisition validity condition. More in particular, the distance $\delta$ is calculated as $\delta = T_m - S_M$ in the case (FIG. 2) of Target more luminous than the Background, as it happens in proximity applications, whereas it is calculated as $\delta = S_m - T_M$ in the case (not shown) of Target less luminous than the Background, as it happens in barrier applications.

If the validity condition is met, the triggering threshold F is typically set exactly in the middle of the distance $\delta$, that is to say, in the case shown in FIG. 2, to $F = S_M + \delta/2 = T_m - \delta/2$. In the case (not shown) of Target less luminous than the Background, the triggering threshold is typically set to $F = T_M + \delta/2 = S_m - \delta/2$.

Afterwards, the triggering hysteresis is calculated, that is to say, the actual switching-on threshold $F_{on}$ and switching-off threshold $F_{off}$ of the photoelectric cell are respectively set by adding to and subtracting from (or vice versa, for the operation in the dark, not shown) the triggering threshold F an hysteresis amount, which can be fixed or proportional to the triggering threshold F.

It must be emphasized that all constants used in the calibration algorithm, including the safety constant and the hysteresis amount, can be different according to the type of photoelectric cell, as they depend on the optical and electronic performances of the specific photoelectric cell. Photoelectric cells with a good optics and good electronics, that is, "stable", can afford using a little constant, whereas not very "precise" photoelectric cell need a greater constant.

Dual-acquisition calibration, according to the prior art, allows optimising the triggering threshold of the photoelectric cell and automatically selecting the operation in the light for the main output Q when the Target is more luminous than the Background or vice versa, the operation in the dark for the main output Q when the Target is less luminous than the Background.

However, the traditional calibration is quite slow and complex, which can be unsatisfactory especially if the accuracy of the detection is not particularly critical.

Thus, the technical problem at the basis of the present invention is to provide an easier and faster calibration method.

This problem is solved, according to the invention, in a method for calibrating a photoelectric cell comprising the steps of carrying out a first acquisition through a certain number of detections of the photoelectric cell in a first condition of the detection field, defining a first interval between the minimum value and the maximum value detected in the first acquisition step, setting a triggering threshold as a value spaced from said first interval by a triggering amount, characterised in that said triggering amount is a function of the amplitude of said first interval.

By "condition of the detection field" it is meant in the presence or absence of an object, respectively. Said method allows avoiding the second acquisition needed in the prior art, that is to say, the step of carrying out a certain number of detections of the photoelectric cell in the opposed condition of the detection field, thus saving time during the calibration.

More in particular, when the first acquisition step occurs carrying out the detections in the condition of the greatest luminosity of the detection field, between the absence and the presence of the object, in the setting step the triggering threshold is set as a value spaced below the first interval by the triggering amount.

Vice versa, when the first acquisition step occurs carrying out the detections in the condition of the lowest luminosity of the detection field, between the absence and the presence of the object, in the setting step the triggering threshold is set as a value spaced above the first interval by the triggering amount.

Preferably, the triggering amount is proportional to the amplitude of the first interval through a safety constant. Such a function exhibits the advantage of being extremely simple, while providing for a certain margin of safety in the setting of the threshold.

More in particular, the safety constant is an inverse function of the optical and electronic performances of the photoelectric cell. In this way, the margin of safety is set in a specific way with respect to the stability of the single photoelectric cell, optimising the distance of the triggering threshold from the expectable range of readings during the operation of the photoelectric cell.

Advantageously, moreover, the safety constant is selectable from a certain number of preset values. This offers the advantage of allowing the final user to optimise the distance of the triggering threshold according to the accuracy requirements of the specific application, still without imposing excessively hard calculations on him.

Advantageously, moreover, the step of setting the triggering threshold is subordinated to a step of checking that said minimum detected value is greater than a preset minimum value. In this way, the calibration is prevented in case the detection field of the photoelectric cell being used is not very luminous, a condition that could imply setting an unreliable triggering threshold.

Moreover, in the method of the invention, preferably the first acquisition step is subordinated to a step of detecting the pressure of an acquisition key for a time at least equal to a preset minimum time. This allows preventing an undesired calibration of the photoelectric cell due to an accidental pressure of the key.

In a second embodiment, the method of the present invention is characterised by the further steps of receiving a selection signal through input means of the photoelectric cell, and if said selection signal has a predetermined value, carrying out a second acquisition through a certain number of second detections of the photoelectric cell in a second condition of the detection field. In this way, the user is provided with the possibility of choosing, upon calibration, the traditional dual-acquisition calibration method, which in some cases can be preferable.

Preferably, said selection signal has said predetermined value if it is detected that the pressure of an acquisition key is being maintained until the end of the first acquisition step.

The method is preferably characterised in that it further comprises the step of defining a second interval between the minimum value and the maximum value detected in the second acquisition, and in that in the step of setting the threshold, said triggering amount is a function of the distance between said first interval and said second interval.

In a preferred way, the triggering amount is proportional to said distance. In an even more preferred way, the triggering amount is equal to half said distance.

In this embodiment, moreover, said step of setting the triggering threshold can be subordinated to a step of checking that said distance is greater than the maximum amplitude between the amplitude of said first interval and the amplitude of said second interval, preferably multiplied by a constant. This allows preventing the calibration in case the reading ranges of the photoelectric cell, in the absence and presence of the object to be detected, are not sufficiently distinct, thus implying a high probability of wrong detection.

Advantageously, the second acquisition step is subordinated to the detection of the pressure of an acquisition key of the photoelectric cell for a time at least equal to a preset minimum time.

In both embodiments, moreover, it can be advantageous to provide for the further steps of setting an activation threshold and a deactivation threshold respectively spaced from said triggering threshold (F) by a hysteresis amount. In this way, in fact, a further margin of safety in the detection is set because, during the rise of the signal, the photoelectric cell switches after having exceeded the triggering threshold and in the same way, during the fall of the signal, the photoelectric cell switches when the signal has further reduced with respect to the triggering threshold.

Typically, moreover, the hysteresis amount is proportional to the triggering threshold. Otherwise, there would be the risk of setting the activation and deactivation thresholds too much beyond the triggering threshold, thus worsening the reliability of the detection instead of improving it.

Figure 4:
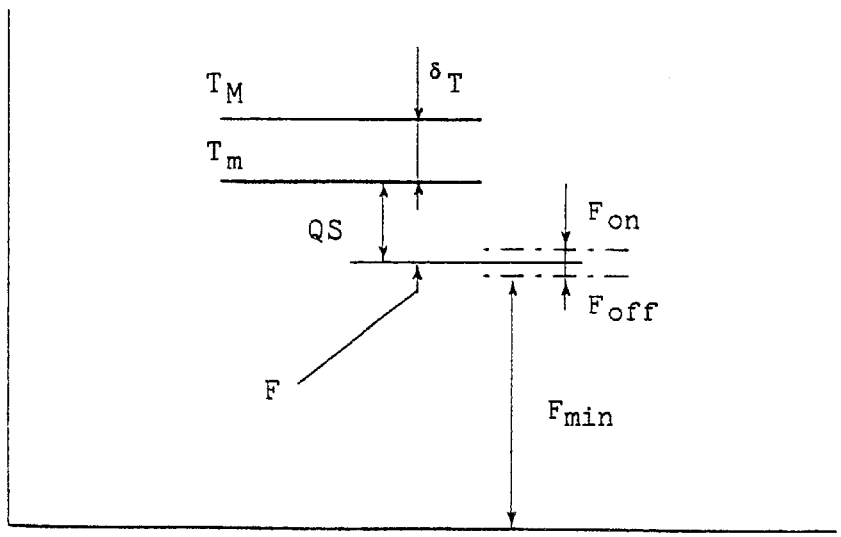
Figure 3:
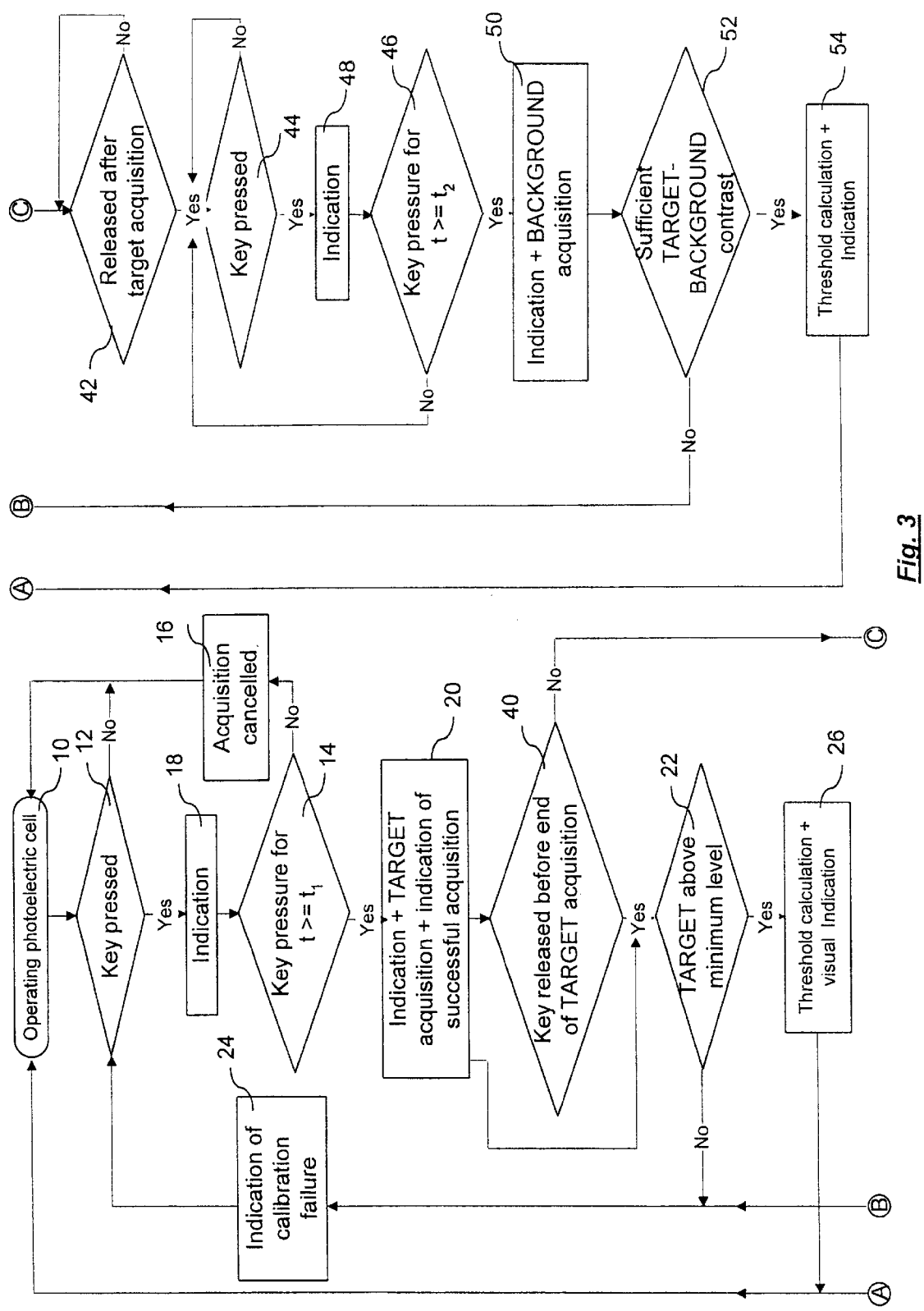

Features and advantages of the invention will now be illustrated with reference to embodiments represented by way of non-limitative example, in the attached drawings, some of which have already been referred to, and wherein:

FIG. 1 illustrates a flow chart of the method for calibrating photoelectric cells according to the prior art, or dual-acquisition method;

FIG. 2 graphically illustrates the signal levels concerning the calibration method according to the prior art;

FIG. 3 illustrates a flow chart of the method for calibrating photoelectric cells according to the present invention; and FIG. 4 graphically illustrates the signal levels concerning the calibration method according to the present invention.

FIG. 3 illustrates a flow chart of a method for calibrating photoelectric cells according to the present invention. The initial part of the algorithm essentially corresponds to the first acquisition of the method according to the prior art. Thus, starting from an operating state 10 of the photoelectric cell, in a first block 12 a first pressure of the acquisition key is waited for, which must last for at least a time $t_1$, typically some seconds, as checked in a block 14; otherwise, the operating state 10 is returned to, cancelling the acquisition in block 16. Preferably, moreover, as indicated with reference numeral 18, there is a visual indication of the pressure of the acquisition key. If the first pressure of the key lasts enough, the Target acquisition block 20 is entered, accompanied by the visual indication of acquisition in progress and successful acquisition.

As illustrated with a direct exit line from block 20, in a block 22 it is then checked whether the Target reading is above a predetermined minimum level. Should that not be the case, the failure of the acquisition is indicated in block 24, and the pressure of the acquisition key is again waited for in block 12, since the calibration is not acceptable. In positive case, the triggering threshold is calculated in a block 26, as it shall be described hereafter, this is indicated and the photoelectric cell returns in the operating state 10.

As it shall be better understood hereinafter, the single-acquisition calibration according to the present invention could be not totally satisfactory for specific applications.

Thus, in a second embodiment of the present invention, it is conveniently allowed to choose between single acquisition and dual acquisition upon calibration, normally upon installation of the photoelectric cell. For this purpose, before the checking step of block 22, there can be a step of checking (block 40) whether the acquisition key has been released before the end of the Target acquisition. The affirmative case is interpreted as choice of single-acquisition calibration, and the calibration is completed as already described, starting from block 22. The negative case is interpreted as choice of dual-acquisition calibration, so that the method continues analogously to the prior art. In particular, in a block 42 it is checked if the acquisition key has been released for at least one moment after the Target acquisition, and afterwards, in block 44, a second pressure of the key is waited for, also lasting for at least a certain time $t_2$ typically of some seconds (block 46) and accompanied by a visual indication (block 48). In the affirmative case, the Background acquisition is carried out in block 50, accompanied by the visual indication. Then, in a block 52 it is checked whether the contrast between Target an Background is sufficient, as described at the beginning of the present description, visually indicating the occurrence or the failure of the calibration in blocks 54 and 24, respectively. In positive case, the photoelectric cell returns to the operating state 10, whereas in negative case, block 12 is returned to, awaiting for the first key pressure.

Summarising, with a simple pressure of the key, the single-acquisition calibration is carried out, and then the triggering threshold is set on the basis of the result of said single acquisition, as it will be described hereafter, whereas with a prolonged pressure, the Target acquisition is carried out and, with a further pressure, the Background is acquired, and then the triggering threshold is set approximately midway.

As said, in the simpler embodiment of the present invention, that is to say, in the single-acquisition calibration, only the Target is acquired. In a similar way to the dual acquisition according to the prior art, it occurs through a certain number of detections, from which the maximum $T_M$ and minimum $T_m$ values of the Target signal are extrapolated (FIG. 4). Said values define an interval having an amplitude $\delta_T = T_M - T_m$. Unlike the prior art, at this point the triggering amount QS (that is to say, the distance of threshold F from the acquired interval) is calculated as a function of the amplitude $\delta_T$ of the interval.

In particular, the function used can be one of proportionality, so that the calculation of the triggering amount can be carried out by multiplying the amplitude $\delta T$ of the interval by a constant K, which depends on the optical and electrical performances of the photoelectric cell itself, thus obtaining a product with which the threshold F is calculated by subtracting it to the minimum value of the Target, that is to say, $F = T_m - QS = T_m - K\delta_T$ Other possible functions relating the triggering amount QS to the amplitude $\delta_T$ of the Target interval can be different linear functions, for example $QS = K(\delta_T + A)$, A being a constant, quadratic functions, etcetera. The addition of constant A to amplitude $\delta_T$ of the interval can be convenient in particular when amplitude $\delta_T$ is substantially null.

Once the triggering threshold F has been obtained, the triggering hysteresis is calculated analogously to the dual-acquisition method described before with reference to the prior art: the switching-on threshold $F_{on}$ and switching-off threshold $F_{off}$ are respectively set by adding to and subtracting from, or vice versa, for the operation in the dark, the triggering threshold F a value (hysteresis amount) which can be fixed or proportional to the triggering threshold F.

Advantageously, there can be provided additional checks, for example that the value of the low threshold of the triggering hysteresis ($F_{off}$ in the illustrated case) is greater than a given minimum signal $F_{min}$ in order to prevent too big reading mistakes which may impair the performances of the photoelectric cell itself.

In the previous description, it has been assumed that the Target is more luminous than the Background, as typically happens in "proximity" applications. To set the operation in the light or in the dark, the double output Q and Qneg of the photoelectric cell is used. That is to say that the user selects output Q for the operation in the light, and selects Qneg for the operation in the dark. As an alternative, another command could be used for setting the operation in the dark, but this is less preferred as it implies a less simplicity of operation.

Should the Background be more luminous than the Target, as in "barrier" or "through-beam" applications, the first acquisition step is carried out on the Background, and afterwards the threshold is set as $F = S_m - QS$, in particular as $F = S_m - K\delta_s$, or the second acquisition, that of the Target, is carried out, according to the user's choice.

As an alternative, it is possible to carry out the first acquisition in the conditions of minimum luminosity, setting the triggering threshold F as a value spaced above the interval of the acquired values. Thus, if the Target is less luminous than the Background ("barrier" applications), the first acquisition can be carried out in the presence of the object, setting the triggering threshold as $F=T_M+QS$, in particular as $F=T_M+K\delta_T$. If the Target is more luminous than the Background ("proximity" applications), the first acquisition can be carried out on the Background, setting the triggering threshold as $F=S_M+QS$, in particular as $F=S_M+K\delta_s$. The function relating the triggering amount to the interval amplitude, in particular the proportionality constant K, substantially represents a margin of safety for the photoelectric cell. Thus, the criterion for selecting said constant depends on the photoelectric cell itself, in particular, on its optics and its electronics. In fact, photoelectric cells with a good optics and a good electronics, that is to say, "stable", usually need a small K, whereas not very precise photoelectric cells usually require a greater K. Constant K can also be programmable or selectable from a certain number of values at the user's choice according to the accuracy requirements of the application.

It must be noted that also in conditions of scarce or null contrast between Target and Background, the single-acquisition calibration sets in any case a triggering threshold, which can be disadvantageous. For this reason, the embodiment providing for the choice, by the user, of the type of calibration to be carried out—as described before with reference to FIG. 3—is extremely advantageous.

It is evident that several changes, variants, replacements and integrations can be made to the embodiments described above without thus departing from the scope of the invention, as defined in the following claims.

In particular, the calibration method described can be implemented through software, hardware or firmware. Moreover, all of the visual indications described can be implemented with one or more LEDs, LCDs or other suitable devices, but they can also be omitted or replaced with sound indications.

As regards the second embodiment described, which allows choosing the calibration method upon the calibration itself, of course alternative solutions are possible in place of using the single key, as described. For example, there can be provided two separate keys for acquiring the Target and the Background, or a single acquisition key and a selector of the calibration method. Additionally, it is possible to provide for a single acquisition key and make a distinction between the single-acquisition and the dual-acquisition calibration method in different ways with respect to those described above, for example through a simple pressure or a double pressure of the key, respectively, upon the first calibration.

What is claimed is:

1. Method for calibrating a photoelectric cell, comprising the steps of:
    carrying out a first acquisition (20) through a certain number of detections of the photoelectric cell in a first condition of the detection field,
    defining a first interval between the minimum value and the maximum value detected in the first acquisition step ($T_m$, $T_M$; $S_m$, $S_M$),
    setting (26) a triggering threshold (F) as a value spaced from said first interval by a triggering amount (QS),
    characterised in that said triggering amount (QS) is a function of the amplitude ($\delta_T=T_M-T_m$; $\delta_S=S_M-S_m$) of said first interval.

2. Method according to claim 1, characterised in that said triggering amount (QS) is proportional to the amplitude ($\delta_T$; $\delta_S$) of said first interval through a safety constant (K).

3. Method according to claim 2, characterised in that the safety constant (K) is an inverse function of the optical and electronic performances of the photoelectric cell.

4. Method according to claim 2, characterised in that the safety constant (K) is selectable from a certain number of preset values.

5. Method according to claim 1, characterised in that said step (26) of setting the triggering threshold (F) is subordinated to a step (22) of checking that said minimum detected value ($T_m$; $S_m$) is greater than a preset minimum value.

6. Method according to claim 1, characterised in that said first acquisition step (26) is subordinated to a step (12, 14) of detecting the pressure of an acquisition key of the photoelectric cell for a time at least equal to a preset minimum time ($t_1$).

7. Method according to claim 1, characterised by the further steps of:
    receiving (40) a selection signal through input means of the photoelectric cell, and if said selection signal has a predetermined value,
    carrying out a second acquisition (50) through a certain number of second detections of the photoelectric cell in a second condition of the detection field.

8. Method according to claim 7, characterised in that said selection signal has said predetermined valve if it is detected that the pressure of an acquisition key is being maintained until the end of the first acquisition step (20).

9. Method according to claim 7, characterised in that it further comprises the step of:
    defining a second interval between the minimum value and the maximum value detected in the second acquisition ($S_m$, $S_M$; $T_m$, $T_M$) and in that in the step (54) of setting the threshold, said triggering amount (QS) is a function of the distance ($\delta$) between said first interval and said second interval.

10. Method according to claim 9, characterised in that said triggering amount (QS) is proportional to said distance ($\delta$).

11. Method according to claim 10, characterised in that said triggering amount (QS) is equal to half said distance ($\delta$).

12. Method according to claim 7, characterised in that said step (54) of setting the triggering threshold (F) is subordinated to a step (52) of checking that said distance ($\delta$) is greater than the maximum amplitude between the amplitude ($\delta_T$; $\delta_S$) of said first interval and the amplitude ($\delta_S$; $\delta_T$) of said second interval.

13. Method according to claim 7, characterised in that said second acquisition step (50) is subordinated to the detection (44, 46) of the pressure of an acquisition key of the photoelectric cell for a time at least equal to a preset minimum time ($t_2$).

14. Method according to claim 1, characterised by the further steps of setting an activation threshold ($F_{on}$) and a deactivation threshold ($F_{off}$) respectively spaced from said triggering threshold (F) by an hysteresis amount.

15. Method according to claim 9, characterised in that the hysteresis amount is proportional to the triggering threshold (F).

16. A method for calibrating a photoelectric cell, said photoelectric cell detecting the condition of a detection field, where said field has a background S and has a target T removably located in said field superimposed upon said background, where one of said target and said background has a greater luminance than the other, said method comprising the steps of:
    carrying out a first acquisition through a plurality of detections of one of the target and the background by the photoelectric cell in the detection field where $T_M$ is a maximum value of the photocell detection of the target and $T_m$ is a minimum value of the photocell detection of the target when the target is acquired in said first acquisition, and $S_M$ is a maximum value of the photocell detection of the background and $S_m$ is a minimum value of the photocell detection of the background when the background is acquired in said first acquisition;

defining a first interval comprised of one of (a) a target interval $\delta_T$ between the target maximum value and the minimum value detected in the first acquisition step ($\delta_T = T_M - T_m$) and (b) a background interval $\delta_S$ between the background maximum value and the minimum value detected in the first acquisition step ($\delta_S = S_M - S_m$); and setting a triggering threshold F as a value spaced from said first interval by a triggering amount QS according to one of (a) $F = T_m - QS$ when the target is acquired in said first acquisition and has higher luminance than the background and (b) $F = T_M + QS$ when the target is acquired in said first acquisition and has lower luminance than the background, (c) $F = S_m - QS$ when the background is acquired in said first acquisition and has higher luminance than the target and (d) $F = S_M + QS$ when the background is acquired in said first acquisition and has lower luminance than the target, wherein said triggering amount QS is a function of the amplitude of said first interval.

17. The method of claim 16, wherein said first acquisition comprises detections of the target and the target has a higher luminance than the background, the target interval $\delta_T$ is calculated in accordance with $\delta_T = T_M - T_m$, and the triggering threshold F is calculated in accordance with $F = T_m - QS$ where $QS = k(\delta_T + A)$, where k and A are constants.

18. The method of claim 17, wherein A is equal to zero.

19. The method of claim 16, wherein said first acquisition comprises detections of the target and the target has a lower luminance than the background, the target interval $\delta_T$ is calculated in accordance with $\delta_T = T_M - T_m$, and the triggering threshold F is calculated in accordance with $F = T_M + QS$ where $QS = k(\delta_T + A)$, where k and A are constants.

20. The method of claim 19, wherein A is equal to zero.

21. The method of claim 16, wherein said first acquisition comprises detections of the background and the background has a higher luminance than the target, the background interval $\delta_S$ is calculated in accordance with $\delta_S = S_M - S_m$, and the triggering threshold F is calculated in accordance with $F = S_m - QS$ where $QS = k(\delta_S + A)$, where k and A are constants.

22. The method of claim 21, wherein A is equal to zero.

23. The method of claim 16, wherein said first acquisition comprises detections of the background and the background has a lower luminance than the target, the background interval $\delta_S$ is calculated in accordance with $\delta_S = S_M - S_m$, and the triggering threshold F is calculated in accordance with $F = S_M + QS$ where $QS = k(\delta_S + A)$, where k and A are constants.

24. The method of claim 23, wherein A is equal to zero.

* * * * *